(12) United States Patent
Tabira et al.

(10) Patent No.: US 7,565,473 B2
(45) Date of Patent: Jul. 21, 2009

(54) SEMICONDUCTOR INTEGRATED CIRCUIT AND ELECTRONIC EQUIPMENT

(75) Inventors: Yoshihiro Tabira, Osaka (JP); Satoshi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 11/403,807

(22) Filed: Apr. 14, 2006

(65) Prior Publication Data
US 2006/0252184 A1 Nov. 9, 2006

(30) Foreign Application Priority Data
Apr. 14, 2005 (JP) ............................. 2005-117345

(51) Int. Cl.
*H05K 7/10* (2006.01)
(52) U.S. Cl. .................................... 710/302
(58) Field of Classification Search ................... 710/62, 710/72, 300, 301, 302, 105, 305, 313; 713/310, 713/320, 322–324, 330, 340
See application file for complete search history.

(56) References Cited

U.S. PATENT DOCUMENTS

| 5,384,540 A * | 1/1995 | Dessel | 324/539 |
|---|---|---|---|
| 6,417,776 B1 * | 7/2002 | Tagishi | 340/635 |
| 7,102,545 B2 * | 9/2006 | Choi | 341/56 |
| 7,392,409 B2 * | 6/2008 | Tateyama | 713/310 |
| 7,423,434 B2 * | 9/2008 | Stancil | 324/539 |
| 2002/0024261 A1 * | 2/2002 | Covaro et al. | 307/149 |
| 2003/0218550 A1 * | 11/2003 | Herrmann | 340/870.39 |
| 2005/0185213 A1 * | 8/2005 | Miki | 358/1.15 |

FOREIGN PATENT DOCUMENTS

| JP | 10-341248 A | 12/1998 |
|---|---|---|
| JP | 11-45130 A | 2/1999 |
| JP | 2001-42975 A | 2/2001 |

OTHER PUBLICATIONS

1394 Overview, Raj Paripatyadar, ControlNet, Nov. 10, 1998.*

* cited by examiner

*Primary Examiner*—Khanh Dang
(74) *Attorney, Agent, or Firm*—McDermott Will & Emery LLP

(57) ABSTRACT

In a semiconductor integrated circuit, a detection confirmation circuit sets the logical level of a second signal according to the logical level of a first signal observed after a lapse of a predetermined time since detection of insertion/removal of a cable for peripheral equipment. The semiconductor integrated circuit operates in a standby mode in which only the insertion/removal detection circuit operates if no cable for peripheral equipment is connected, in a repeater mode in which only PHY operates if a cable for peripheral equipment is connected and CPU is in the suspended state, and in a normal mode in which both PHY and LINK operate if a cable for peripheral equipment is connected and a CPU is in the operating state.

7 Claims, 4 Drawing Sheets

SEMICONDUCTOR INTEGRATED CIRCUIT AND ELECTRONIC EQUIPMENT

CROSS-REFERENCE TO RELATED APPLICATIONS

This application claims priority under 35 U.S.C. §119 on Patent Application No. 2005-117345 filed in Japan on Apr. 14, 2005, the entire contents of which are hereby incorporated by reference.

BACKGROUND OF THE INVENTION

The present invention relates to a semiconductor integrated circuit and electronic equipment, and more particularly to a technology of power control of a semiconductor integrated circuit and electronic equipment made according to the cable connection status and the CPU operation status.

Interface standards such as IEEE (Institute of Electrical and Electronic Engineers) 1394 and HDMI (High-Definition Multimedia Interface) support "hot plugging" that permits insertion/removal of a cable during operation of equipment. Systems conforming to these interface standards are therefore provided with an insertion/removal detection circuit for detecting insertion/removal of a cable.

FIG. 6 shows a configuration of conventional IEEE 1394 interface equipment. Conventionally, a CPU 10, a link layer (LINK) 20 and a physical layer (PHY) 30 were implemented from individual chips. In recent years, however, semiconductor integrated circuits implementing the PHY 30 and the LINK 20 on one chip have come on the market.

An insertion/removal detection circuit 31 of the PHY 30 is kept powered so as to be able to detect connection of a cable C1 for a given peripheral equipment unit or a cable C2 for another peripheral equipment unit even when the PHY 30 is in a power-down mode. Once the insertion/removal detection circuit 31 detects an event of cable connection, it changes the logical level of a signal CDT. The CPU 10 then detects the cable connection from the change of the logical level, and performs recovery control for the PHY 30. Specifically, the CPU 10 instructs the PHY 30 to start operation by issuing a signal PWD. The PHY 30, which has started operation in response to this instruction, generates a clock signal CLK and supplies the generated clock signal to the LINK 20 that is in the power-down mode. With the supply of the clock signal CLK, the LINK 20 starts operation.

In the IEEE 1394 interface, power-down control can be made for the PHY 30 and the LINK 20 of which operation is unnecessary during no cable connection, to thereby attain power reduction. The CPU 10 however must continue operating for detecting the cable connection status. If the CPU 10 is also powered down, the recovery control of the PHY 30 will not be made even when the insertion/removal detection circuit 31 detects cable connection, and thus operation of relaying data transfer between the peripheral equipment (repeater operation) will not be available although the cables C1 and C2 are connected to the interface. In the IEEE 1394 interface, therefore, it is difficult to attain further reduction in power consumption as the entire interface equipment while enabling the function of the PHY 30 as the repeater.

There is another technique in which the recovery control of the PHY 30 that is in the power-down mode can be made when the insertion/removal detection circuit 31 detects cable connection, irrespective of the operation status of the CPU 10. According to this technique, the PHY 30 in the power-down mode recovers once the cables C1 and C2 are connected thereto even when the CPU 10 is in the power-down mode, and functions as the repeater.

In general, chattering occurs in insertion/removal of a cable, in which the cable connected and disconnected states are repeated alternately every interval of several milliseconds to several tens milliseconds. Therefore, chattering-caused noise is superimposed on a cable connection detection signal (signal CDT). Use of such a noise-containing cable connection detection signal for control of the interface equipment may cause a malfunction and thus is not desirable. It is therefore necessary to remove chattering-caused noise from the cable connection detection signal.

In the case described above that the PHY 30 is made to operate as the repeater when the CPU 10 is in the power-down state, since the clock signal CLK is supplied to the LINK 20 with the recovery of the PHY 30, the LINK 20 also recovers. However, as only the operation of the PHY 30 is required for the repeater operation, the LINK 20 should preferably be kept powered-down from the viewpoint of reduction in power consumption as the entire interface equipment.

SUMMARY OF THE INVENTION

An object of the present invention is attaining power reduction for a semiconductor integrated circuit that supports hot plugging in IEEE 1394, HDMI and the like and conforms to the communication interface standards permitting data transfer between peripheral equipment without involvement of a CPU.

The semiconductor integrated circuit of the present invention is a semiconductor integrated circuit adapted to switching its operation mode according to the cable connection status for peripheral equipment and the operation status of an internal or external CPU. The semiconductor integrated circuit includes: a low-level interface for transmitting/receiving a signal to/from a cable for peripheral equipment; and a high-level interface for performing communication between the low-level interface and the CPU. The low-level interface includes: an insertion/removal detection circuit for changing the logical level of a first signal to a first logical level if at least one cable for peripheral equipment is inserted and changing the logical level of the first signal to a second logical level if all cables for peripheral equipment are removed; and a detection conformation circuit for setting a second signal at the first logical level if the first signal is in the first logical level after a lapse of a predetermined time from a change of the logical level of the first signal, and setting the second signal at the second logical level if the first signal is in the second logical level. The semiconductor integrated circuit operates in a first mode in which only the insertion/removal detection circuit operates if the second signal is in the second logical level, operates in a second mode in which only the low-level interface operates if the second signal is in the first logical level and the CPU is in a suspended state, and operates in a third mode in which both the low-level interface and the high-level interface operate if the second signal is in the first logical level and the CPU is in an operating state.

According to the invention described above, insertion/removal of a cable is detected by the insertion/removal detection circuit, and the logical level of the second signal is set by the detection confirmation circuit according to the logical level of the first signal observed after a lapse of a predetermined time from the cable insertion/removal. With this setting, the connection/disconnection of a cable can be confirmed only after settling down of chattering occurring at insertion/removal of a cable, and thus the second signal as the cable connection detection signal includes no chattering-caused noise. Also, the operation mode of the semiconductor integrated circuit of the present invention switches among the first mode in which only the insertion/removal detection circuit operates, the second mode in which only the low-level interface operates, and the third mode in which both the low-level interface and the high-level interface operate, according to the logical level of the second signal and the operation status of the CPU. In particular, in the second mode, reduction in power consumption as the entire semiconductor integrated circuit can be ensured while the operation as the repeater is secured.

Specifically, the detection confirmation circuit preferably includes: a counter circuit for starting pulse counting of a supplied clock signal at the time of a change of the logical level of the first signal, stopping the pulse counting once the pulse count value reaches a predetermined value, and setting the logical level of the second signal according to the logical level of the first signal at the time of stop of the pulse counting; and a clock generation circuit for starting generation of the clock signal at the time of a change of the logical level of the first signal and stopping the generation of the clock signal if the pulse counting is stopped and the first signal or the second signal is in the second level. The low-level interface may supply the clock signal to the high-level interface if the second signal is in the first logical level and the CPU is in the operating state. The high-level interface may operate with supply of the clock signal.

Preferably, the semiconductor integrated circuit described above further includes a mode selection section for selecting enabling or disabling of the second mode.

Specifically, in the semiconductor integrated circuit described above, communication with the peripheral equipment may conform to IEEE 1394 or HDMI standards, and the low-level interface may be a physical layer.

The electronic equipment of the present invention includes the semiconductor integrated circuit described above, and the operation mode of the semiconductor integrated circuit is displayed on a user interface.

According to the present invention, the semiconductor integrated circuit that supports hot plugging and conforms to the communication interface standards permitting data transfer between peripheral equipment without involvement of CPU is provided with an additional operation mode in which only the minimum necessary portion of the semiconductor integrated circuit operates for the repeater operation, to attain reduction in power consumption as the entire semiconductor integrated circuit.

DESCRIPTION OF THE PREFERRED EMBODIMENTS

Hereinafter, a preferred embodiment helpful for understanding the present invention will be described with reference to the accompanying drawings.

Figure 1:
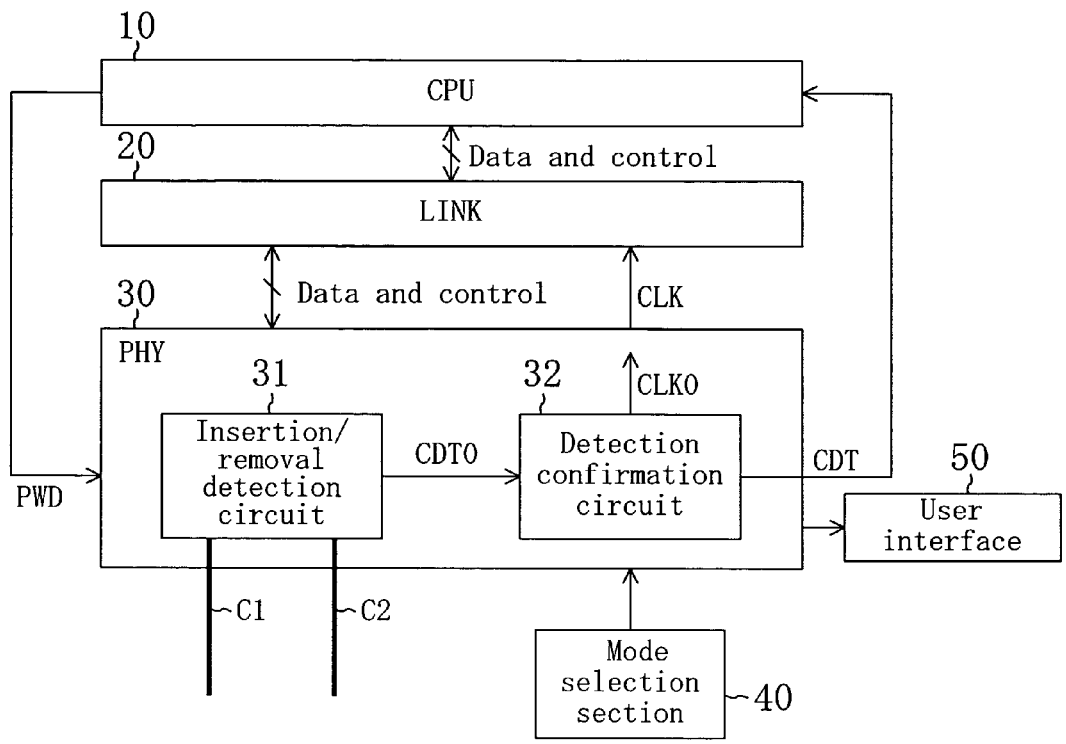
FIG. 1 is a block diagram of a semiconductor integrated circuit of an embodiment helpful for understanding the present invention.

FIG. 1 shows a configuration of a semiconductor integrated circuit of an embodiment helpful for understanding the present invention. The semiconductor integrated circuit of this embodiment, which performs data communication conforming to IEEE 1394, for example, includes PHY 30 as a low-level interface, LINK 20 as a high-level interface, and a mode selection section 40. A CPU 10 may be placed inside or outside the semiconductor integrated circuit. The high-level interface as used herein refers to the portion of the interface existing between peripheral equipment and the CPU 10 other than the low-level interface, and includes, not only the link layer (LINK 20), but also a transaction layer and IEC 61883, MPEG processing, SBP2 and other application layers.

The PHY 30 includes an insertion/removal detection circuit 31 and a detection confirmation circuit 32. The insertion/removal detection circuit 31 detects connection/disconnection of cables C1 and C2 for peripheral equipment, and determines the logical level of a signal CDT0 according to the cable connection state. Specifically, the signal CDT0 is in a low (Lo) level when no cable is connected, and is in a high (Hi) level when a cable is connected. That is, the signal CDT0 is set at Hi level if at least one cable is connected, and is set at Lo level if all cables are disconnected.

As described earlier, the signal CDT0 includes chattering-caused noise. The detection confirmation circuit 32 removes chattering-caused noise included in the signal CDT0 and outputs a signal CDT as the cable connection detection signal. That is, the detection confirmation circuit 32 confirms the signal CDT0 observed after a lapse of a time long enough for chattering occurring along with an event of cable connection or disconnection to settle down, as the cable connection detection signal, and outputs the confirmed signal CDT as the cable connection detection signal.

Figure 2:
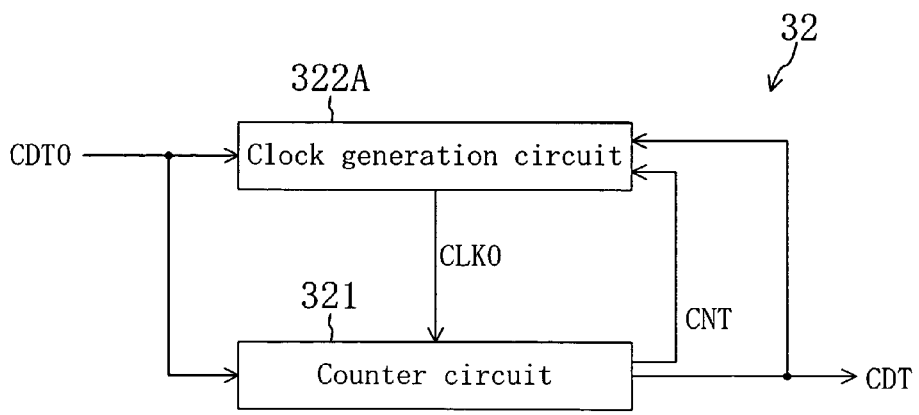
FIG. 2 is a block diagram of an example of a detection confirmation circuit in the embodiment.

FIG. 2 shows a configuration of an example of the detection confirmation circuit 32. A counter circuit 321 starts pulse counting of a clock signal CLK0 generated by a clock generation circuit 322A at the time of a change of the logical level of the signal CDT0 caused by connection or disconnection of a cable, and stops the pulse counting once the pulse count value reaches a predetermined value. The counter circuit 321 sets the signal CDT at Hi level if the logical level of the signal CDT0 at the time of the stop of the pulse counting is Hi, and sets the signal CDT at Lo level if the logical level of the signal CDT0 at the above time is Lo. The counter circuit 321 also puts a signal CNT in Hi level during the execution of the pulse counting.

The clock generation circuit 322A starts generation of the clock signal CLK0 at the time of a change of the logical level of the signal CDT0. The clock generation circuit 322A continues the generation of the clock signal CLK0 if the signal CDT is Hi at the time of the stop of the pulse counting by the counter circuit 321, and stops the generation of the clock signal CLK0 if the signal CDT is Lo at the above time. In other words, whether to continue or stop the generation of the clock signal CLK0 is determined based on the confirmed cable connection detection signal.

Figure 3:
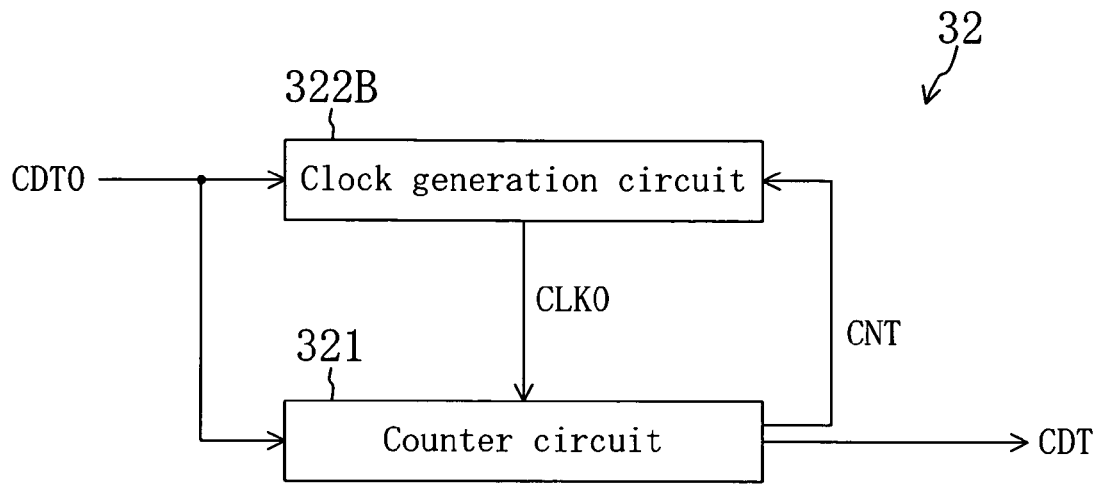
FIG. 3 is a block diagram of another example of the detection confirmation circuit of the embodiment.

FIG. 3 shows a configuration of another example of the detection confirmation circuit 32. The counter circuit 321 is the same as that described above. A clock generation circuit 322B, which makes reference to the signal CDT0, not the signal CDT as described above, continues the generation of the clock signal CLK0 if the signal CDT0 is Hi at the time of the stop of the pulse counting by the counter circuit 321, and stops the generation of the clock signal CLK0 if the signal CDT0 is Lo at the above time.

The clock signal CLK0 is not only used for the pulse counting by the counter circuit 321, but also serves as the basis of the operation of the PHY 30 and the LINK 20. Referring back to FIG. 1, the PHY 30 operates with supply of the clock signal CLK0. That is, the PHY 30 in its power-down state recovers once at least one cable is connected. Naturally, as in the conventional case, the recovery control with a signal PWD from the CPU 10 is also available.

The PHY 30 may not be made to recover immediately after generation of the clock signal CLK0, but the condition that the signal CDT should be Hi may be added for recovery of the PHY 30. This can prevent the recovery control of the PHY 30 from being performed during the chattering-including unstable time period, and thus enables more stable recovery control.

The PHY 30 also supplies the clock signal CLK0 to the LINK 20 as a clock signal CLK if the signal CDT is Hi and the CPU 10 is in the operating state. The LINK 20 recovers from its power-down state with the supply of the clock signal CLK. In other words, when the CPU 10 is in the suspended state, the LINK 20 is kept in the power-down state having no supply of the clock signal CLK while the PHY 30 can operate with connection of a cable.

Figure 4:
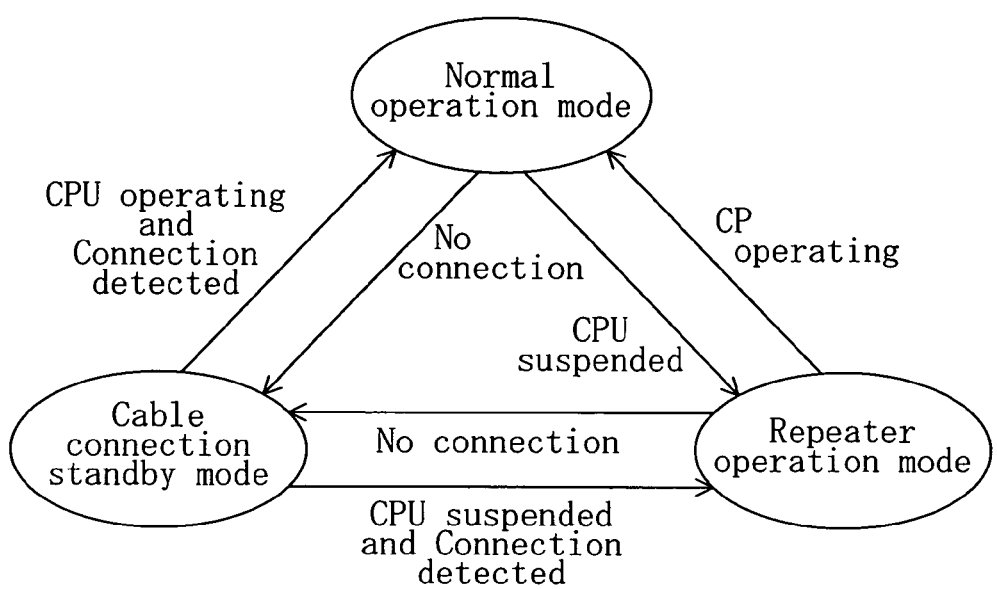
FIG. 4 is a transition diagram of the operation mode in the semiconductor integrated circuit.

As described above, the semiconductor integrated circuit of this embodiment operates in a cable connection standby mode (also called a standby mode) in which only the insertion/removal detection circuit 31 operates if the signal CDT is Lo, in a repeater operation mode (also called a repeater mode) in which only the PHY 30 operates if the signal CDT is Hi and the CPU 10 is in the suspended state, and in a normal operation mode (also called a normal mode) in which both the PHY 30 and the LINK 20 operate if the signal CDT is Hi and the CPU 10 is in the operating state. FIG. 4 is a transition diagram of these operation modes. When no cable is connected, the semiconductor integrated circuit operates in the standby mode. Once at least one cable is connected, transition is made to the normal mode if the CPU 10 is operating or to the repeater mode if the CPU 10 is suspended.

In the repeater mode, only the PHY 30 operates, permitting relaying of data transfer between connected peripheral equipment. Also, with the LINK 20 being in the power-down state, the power consumption of the entire semiconductor integrated circuit can be reduced. If operation of the CPU 10 is started during the repeater mode, the semiconductor integrated circuit makes transition to the normal mode. It is only at this time that the LINK 20 recovers, enabling communication between the connected peripheral equipment and the CPU 10. If the cables for all the peripheral equipment are disconnected during the repeater mode, the semiconductor integrated circuit makes transition to the standby mode.

In the normal mode, in which all of the CPU 10, the LINK 20 and the PHY 30 are operating, communication between the CPU 10 and the connected peripheral equipment is available in addition to the relaying of data transfer between the connected peripheral equipment. If the CPU 10 is powered down during the normal mode, the semiconductor integrated circuit makes transition to the repeater mode. At this time, the LINK 20 is also powered down, but this will cause no problem because there is no communication between the peripheral equipment and the CPU 10. If the cables for all the peripheral equipment are disconnected during the normal mode, the semiconductor integrated circuit makes transition to the standby mode.

The change of the signals and the transition of the operation mode will be described with reference to the timing chart of FIG. 5. If a cable is connected during the standby mode, the signal CDT0 changes to Hi level. With this change of the signal CDT0 to Hi level, generation of the clock signal CLK0 is started, and also the pulse counting is started, causing change of the signal CNT to Hi level. Once the pulse counting stops after counting of a predetermined number of pulses, the signal CNT becomes Lo. At this time, by which chattering-caused noise of the signal CDT0 should have settled down, the signal CDT becomes Hi based on the current logical level of the signal CDT0. Since the signal CDT is Hi (or the signal CDT0 is Hi), the generation of the clock signal CLK0 is continued.

Figure 5:
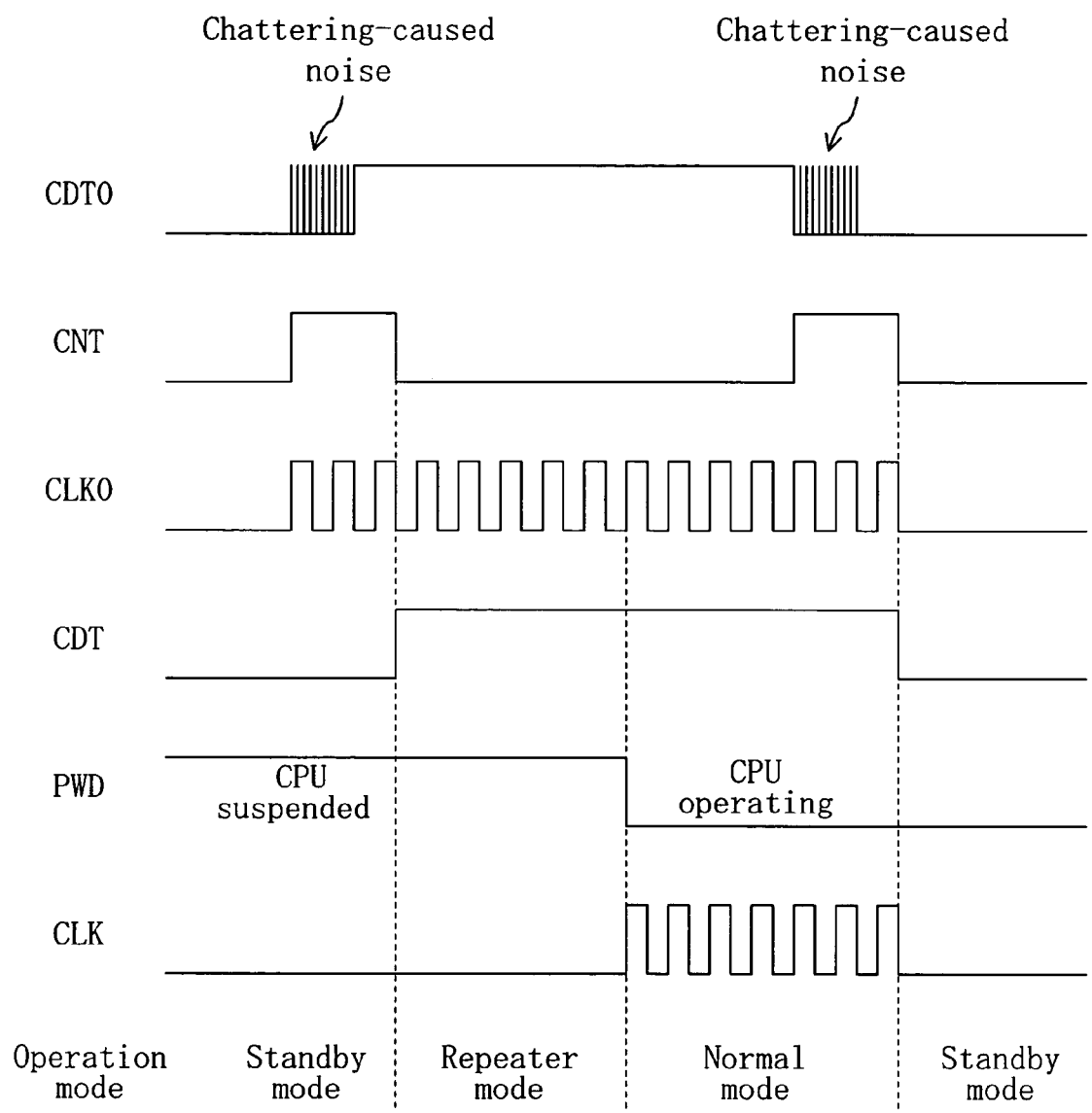
FIG. 5 is a timing chart of the semiconductor integrated circuit of the embodiment helpful for understanding the present invention.
Figure 6:
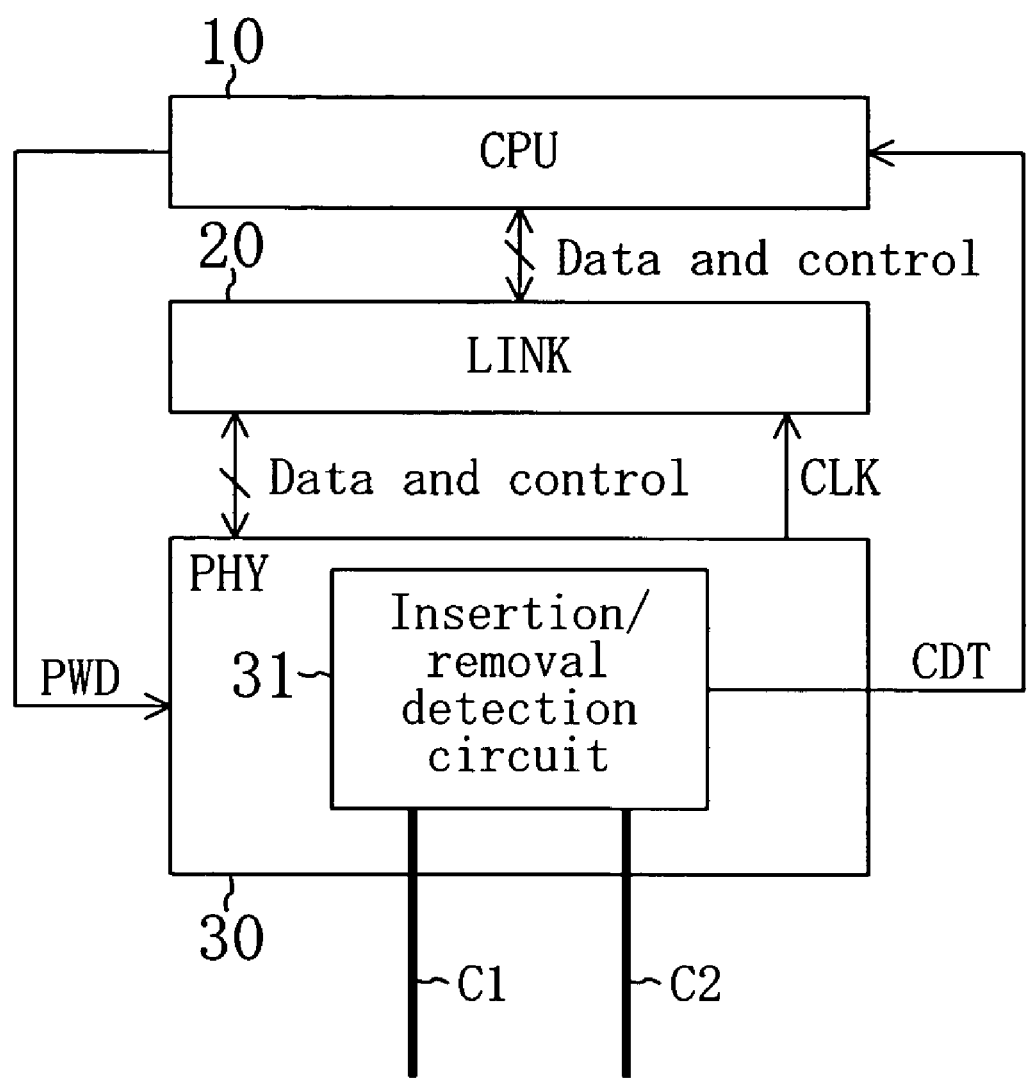
FIG. 6 is a block diagram of a conventional IEEE 1394 interface.

In the example shown in FIG. 5, the signal PWD is Hi at the time when the signal CDT becomes Hi, indicating that the CPU is in the suspended state. Therefore, the clock signal CLK is not output, and thus transition is made to the repeater mode. The CPU then moves to the operating state, changing the signal PWD to Lo level. Output of the clock signal CLK is then started and thus transition is made to the normal mode.

When the cable is disconnected, the signal CDT0 changes to Lo level. With this change of the signal CDT0 to Lo level, pulse counting of the clock signal CLK0 is started, causing change of the signal CNT to Hi level. Once the pulse counting stops after counting of a predetermined number of pulses, the signal CNT becomes Lo. At this time, by which chattering-caused noise of the signal CDT0 should have settled down, the signal CDT becomes Lo based on the current logical level of the signal CDT0. Since the signal CDT is Lo (or the signal CDT0 is Lo), the generation of the clock signal CLK0 is stopped. With the stop of generation of the clock signal CLK0, the output of the clock signal CLK is stopped and thus transition is made to the standby mode again.

Referring back to FIG. 1, the mode selection section 40 selects whether to enable or disable the repeater mode. The mode selection section 40 may be an input terminal of the semiconductor integrated circuit, for example, to permit static switching between enabling/disabling of the repeater mode with ON/OFF of this input terminal. If the repeater mode is disabled, the semiconductor integrated circuit will serve as the conventional semiconductor integrated circuit. A set customer (LSI user) who requests for functions equivalent to those of the currently-available one can use the semiconductor integrated circuit of this embodiment without the necessity of design change and the like. The mode selection section 40 may otherwise be made to permit dynamic switching between enabling/disabling of the repeater mode. With the above function, the following operation becomes available, for example. The repeater mode may be enabled when electronic equipment including the semiconductor integrated circuit of this embodiment is operating with an internal battery, so that the LINK 20 be powered down if the CPU 10 is in the power-down mode, to thereby suppress power consumption. When the electronic equipment is operating with utility supply, the LINK 20 may be made to operate in association with the operation of the CPU 10.

A user interface 50, which is part of the electronic equipment including the semiconductor integrated circuit of this embodiment, displays the operation mode of the semiconductor integrated circuit. With this display, the user can be informed of in which operation mode the electronic equipment is currently operating.

Substantially the same effect as that described above can also be provided for HDMI interfaces by adopting the semiconductor integrated circuit of the present invention. The present invention is also applicable to Ethernet (registered trademark) related routers and switching hubs. In the case of routers, a physical layer, a data link layer and a network layer in an OSI reference model correspond to the low-level interface, and in the case of switching hubs, a physical layer and a data link layer correspond to the low-level interface.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A semiconductor integrated circuit adapted to switching an operation mode thereof according to cable connection status for peripheral equipment and operation status of an internal or external CPU, the circuit comprising:
    a low-level interface for transmitting/receiving a signal to/from a cable for peripheral equipment; and
    a high-level interface for performing communication between the low-level interface and the CPU,
    wherein the low-level interface comprises:
    an insertion/removal detection circuit for outputting a first signal, and for changing a logical level of the first signal to a first logical level if at least one cable for peripheral equipment is inserted and changing the logical level of the first signal to a second logical level if all cables for peripheral equipment are removed; and
    a detection confirmation circuit for receiving the first signal from the insertion/removal detection circuit, and for setting a second signal at a first logical level if the first signal is in the first logical level after a lapse of a predetermined time from a change of the logical level of the first signal, and setting the second signal at a second logical level if the first signal is in the second logical level, and
    the semiconductor integrated circuit operates in a first mode in which only the insertion/removal detection circuit operates if the second signal is in the second logical level, operates in a second mode in which only the low-level interface operates if the second signal is in the first logical level and the CPU is in a suspended state, and operates in a third mode in which both the low-level interface and the high-level interface operate if the second signal is in the first logical level and the CPU is in an operating state.

2. The semiconductor integrated circuit of claim 1, wherein the detection confirmation circuit comprises:
    a counter circuit for starting pulse counting of a supplied clock signal at the time of a change of the logical level of the first signal, stopping the pulse counting once the pulse count value reaches a predetermined value, and setting the logical level of the second signal according to the logical level of the first signal at the time of stop of the pulse counting; and
    a clock generation circuit for starting generation of the clock signal at the time of a change of the logical level of the first signal and stopping the generation of the clock signal if the pulse counting is stopped and the first signal or the second signal is in the second level,
    the low-level interface supplies the clock signal to the high-level interface if the second signal is in the first logical level and the CPU is in the operating state, and
    the high-level interface operates with supply of the clock signal.

3. The semiconductor integrated circuit of claim 1, further comprising a mode selection section for selecting enabling or disabling of the second mode.

4. The semiconductor integrated circuit of claim 1, wherein communication with the peripheral equipment conforms to IEEE 1394, and
    the low-level interface is a physical layer.

5. The semiconductor integrated circuit of claim 1, wherein communication with the peripheral equipment conforms to HDMI, and
    the low-level interface is a physical layer.

6. Electronic equipment comprising the semiconductor integrated circuit of claim 1, wherein the operation mode of the semiconductor integrated circuit is displayed on a user interface.

7. A semiconductor integrated circuit adapted to detecting the cable connection status, comprising:
    an insertion/removal detection circuit for outputting a first signal, and for changing a logical level of the first signal to a first logical level if at least one cable is inserted and changing the logical level of the first signal to a second logical level if all cables are removed;
    a counter circuit for receiving the first signal from the insertion/removal detection circuit, and for starting pulse counting of a supplied clock signal at the time of a change of the logical level of the first signal, stopping the pulse counting once the pulse count value reaches a predetermined value, and setting the logical level of the second signal according to the logical level of the first signal at the time of stop of the pulse counting; and
    a clock generation circuit for starting generation of the clock signal at the time of a change of the logical level of the first signal and stopping the generation of the clock signal if the pulse counting is stopped and the first signal is in the second level or the second signal is in a predetermined logical level,
    wherein the second signal is output as a cable connection detection signal.

* * * * *